United States Patent [19]

Bowen

[11] 3,790,744
[45] Feb. 5, 1974

[54] METHOD OF FORMING A LINE OF WEAKNESS IN A MULTILAYER LAMINATE

[75] Inventor: William Edmund Bowen, Trenton, N.J.

[73] Assignee: American Can Company, Greenwich, Conn.

[22] Filed: July 19, 1971

[21] Appl. No.: 163,567

[52] U.S. Cl............... 219/121 LM, 83/6, 156/250, 156/268, 156/272, 225/93.5, 264/22, 264/25
[51] Int. Cl.............................................. B23k 27/00
[58] Field of Search.... 219/121 L, 121 EB, 68, 384; 156/250, 268, 272; 264/22, 25; 346/76; 83/6, 170; 225/93.5, 96

[56] References Cited
UNITED STATES PATENTS

| | | | |
|---|---|---|---|
| 3,665,483 | 5/1972 | Becker et al. | 346/1 |
| 3,262,122 | 7/1966 | Fleisher et al. | 219/121 LM |
| 3,549,733 | 12/1970 | Caddell | 219/121 LM |
| 3,626,143 | 12/1971 | Fry | 219/121 LM |
| 3,560,291 | 2/1971 | Foglia | 219/121 LM |
| 3,530,573 | 9/1970 | Helgeland | 219/121 LM |
| 3,475,760 | 10/1969 | Carlson | 219/121 LM |
| 3,205,094 | 9/1965 | Erlandson | 219/68 |
| 3,314,073 | 4/1967 | Becker | 219/121 L |
| 3,305,666 | 2/1967 | Zaromb | 219/121 LM |

*Primary Examiner*—J. V. Truhe
*Assistant Examiner*—George A. Montanye
*Attorney, Agent, or Firm*—Robert P. Auber; Paul R. Audet; George P. Ziehmer

[57] ABSTRACT

A method of forming a line of weakness in at least one but not all layers of multilayer laminate which comprises effecting relative movement between a beam of radiant energy of a particular predetermined wavelength and intensity and the laminate so that the energy is selectively relatively absorbed by at least one layer in an amount and manner that alters the structure of the layer and thereby forms a line of weakness in the laminate. The source of radiant energy preferably is a laser. The laminate layers can be comprised of any material used in manufacturing multilayer packaging laminates such as thermoplastics, thermosets, paper and foil. Preferably, the laminate includes at least one layer of thermoplastic material. The layer that absorbs more energy can be an adhesive.

30 Claims, 11 Drawing Figures

5 WATTS – 300 ft/MIN.

FIG. 4

5 WATTS – 200 ft/MIN.

FIG. 5

5 WATTS – 100 ft/MIN.

INVENTOR
WILLIAM EDMUND BOWEN
ATTORNEY

FIG. 8
25 WATTS
950 ft/MIN.

INVENTOR
WILLIAM EDMUND BOWEN

ATTORNEY

FIG. 9  25 WATTS – 500 ft/MIN.

FIG. 10  20 WATTS – 900 ft/MIN.

FIG. 11  20 WATTS – 700 ft/MIN.

INVENTOR
WILLIAM EDMUND BOWEN
Leonard R. Kohan

METHOD OF FORMING A LINE OF WEAKNESS IN A MULTILAYER LAMINATE

This invention relates to a method of forming a line of weakness in multilayer laminates. More particularly, the invention is directed to the use of laser radiant energy to form an easy open tear line in multilayer laminates, especially those made with polymeric materials.

To date, there is no commercially efficient and practical method of forming a line of weakness such as a reliable, preferential, easy opening tear line in multilayer polymeric laminates. Consequently, it is difficult, if not impossible, to easily and straightly tear open multilayer plastic packages containing a wide variety of goods such as natural and frozen foods.

Thermoplastic materials, for example, are difficult to tear because the materials are flexible and are usually comprised of randomly dispersed, long chains of molecules having relatively strong covalent carbon-to-carbon bonds. One method of easing tearing is generally to stretch or orient the thermoplastic materials as they are being cast or blown. Stretching lines up the molecular chains in the stretched direction so that if tearing occurs in that direction, it takes place through weaker non-carbon-to-carbon bonds. This method has limited effectiveness because not all polymers can be readily oriented. Also, only a certain amount of molecules can be aligned, and, despite the stretching, tearing may still not be easy and reliable. Orienting also requires special manufacturing effects and care. Another method of forming a tear line, widely used for single layer films, is to employ a star wheel to form a line of intermittent perforations in the films. Perforations are unsuitable for multilayer laminates, among other reasons because they allow product-environment exchanges which defeat a purpose of using multilayers, i.e., for example, to protect an interiorly contained product by combining gas barrier properties of one material with moisture barrier properties of another.

Still another method, that of using laser radiant energy to form a tear line in single layer thermoplastic films, is disclosed in U.S. Pat. No. 3,626,143, issued on Dec. 7, 1971, and assigned to by the same assignee as the applicant assignee of this invention. That application, herein incorporated by reference, discloses that by precisely controlling the focus of a laser beam and its velocity in relation to and along a path of a single layer thermoplastic film, a score line can be effected in the film. A "score," by definition, is a groove that penetrates only a portion of but does not cut through the total thickness of a film. If the relative velocity is not great enough, the beam will linger on a portion of the film and will cut completely therethorugh. Generally speaking, the application also discloses that laser energy of a given wavelength is absorbed by partly transparent thermosplastic films, and the heat resulting from the energy absorbed degrades the film and thereby forms a groove or score therein.

The method of this invention involves use of radiant energy such as from a laser beam to form an easy open tear line in multilayer laminates. It has been found that by selecting a laser of a particular wavelength and selecting as the laminate at least two layers of material which absorb different amounts of energy of that wavelength, a preferential line of weakness or tear line can be selectively formed in the more absorptive of the layers and in the laminate without materially affecting at least one of the less absorptive layers.

The method is advantageous because it is a rapid and efficient way of providing a dependable easy opening preferential tear line which does not materially weaken or otherwise affect the overall product-environment exchange barrier and/or other desirable properties of constituent layers or of the composite multilayer laminate. The method is also advantageous because it reduces the heretofore criticality of laser-laminate operating conditions. For example, whereas a single layer laminate may be cut completely through due to lengthy laser exposure during an inadvertent machine slowdown, this occurrence is less likely with a multilayer structure having its absorptive layer laminated to a relatively transparent layer. The latter would be transparent to and relatively unaffected by and would remain intact despite the excess exposure energy.

As is well known, a laser is a device which emits a powerful, concentrated beam of light. The beam is stimulated, amplified, electromagnetic radiation and is made up of light waves all of which are, for all practical purposes, coherent, i.e., in phase, and monochromatic, i.e., of the same wavelength. Each laser is usually named according to the particular lasing medium which it employs, and, depending on the particular atomic structure of that medium, each laser emits its own specific and characteristic wavelength, i.e., one of a well defined frequency. Laser wavelengths can range from about 0.2 to about 40 microns and their frequencies from about $1.5 \times 10^{15}$ to about $0.75 \times 10^{13}$ cycles per second.

Laser light waves transport great energy. The power available from such energy can range from a fraction of a watt to many thousand watts. The intensity of the energy, i.e., the amount that flows per second across a unit area of material perpendicular to the beam, can be varied and controlled by, for example, varying the focus of the beam according to various known methods.

The energy of a laser beam is transported according to the output pattern or mode structure of the beam. A beam can have a single or multimode structure. A beam of single mode output, designated TEMoo, has all its energy in a single hot spot with an intensity distribution that follows a gaussian curve when the intensity points are taken along a line perpendicular to the axis of the beam. A multimode beam is comprised of a series of rings and/or spots symmetrical about the beam axis. The single mode beam can be focused to a smaller spot diameter than the multimode beam. Such a spot has very high intensity and is therefore the most valuable for cutting and scoring.

Laser radiation is of two types, pulsed and continuous. The former involves short, relatively high powered pulses or emissions which can span, for peak pulses, from about 15 nanoseconds to about 1 millisecond, and for standard control pulses, from about 1 millisecond to greater than one second. Continuous or steady-rate emissions are preferred for industrial use because they transport a substantially greater amount of total energy.

Examples of several types of lasers available for industrial use are: gaseous lasers such as carbon dioxide or helium-neon; solid state light pumped lasers such as ruby, neodymium-yttrium aluminum garnet (Nd-YAG), or glass, semi-conductor lasers such as gallium arsenide, and plastic lasers and lasers using conjugated organic molecules such as benzene, toluene or napthalene.

It is an object of the present invention to provide an improved method of working multilayer materials.

Another object of the present invention is to provide an improved method of forming a line of weaknesss in multilayer laminates having at least one polymeric layer.

Another object of the present invention is an improved method of forming easy-open preferential tear lines in multilayer laminates whose layers are polymeric.

Still another object of the present invention is to provide an improved method of forming an easy open preferential tear line which does not materially alter the strength or desirable product-environment exchange and/or barrier properties of the laminate.

Yet another object of the present invention is to provide an improved method of forming a line of weakness in multilayer laminates by impinging radiant energy upon laminates made of materials having different absorption and/or degradation characteristics at the wavelength of the radiant energy being used.

Yet still another object of the present invention is to provide an improved method of forming a line of weakness in multilayer polymeric materials which reduces the criticality of laser working parameters.

BRIEF SUMMARY OF THE INVENTION

This invention is a method of forming at least one line of weakness in at least one but not all layers of a multilayer laminate. The method comprises effecting along a predetermined path relative movement between the laminate and a laser beam of radiant energy. The energy has a wavelength and an intensity that is selectively relatively absorbed by the at least one layer. The energy absorbed is of an amount sufficient to alter the structure of the layer in a manner that forms the line of weakness in the laminate. The source of the radiant energy can be a laser and the beam of radiant energy can be interrupted so that the line of weakness if not continuous. The laminate or any or all of its layers preferably is but need not be at least partly flexible. Materials comprising the layers can be polymeric such as thermoplastic and thermoset, composite such as paper or non-polymeric such as foil. The at least one layer can be an adhesive and usually is but need not be the more absorptive layer, i.e., the one having the highest coefficient of absorption. The at least one layer can be of any proximity in relation to the source of radiant energy. One or more of the non-proximate layers other than the at least one layer can be foil and can reflect an amount of energy that aids in forming the line of weakness in the at least one layer. The layers or their surfaces can be treated to make them more absorptive. One or more of the layers can be oriented in a predetermined direction to aid in the forming of the line of weakness and thereby achieve greater processing speed and/or to impart a preferential weakness in the laminate that cooperates with the formed line of weakness and thereby achieve easier manipulation of the laminate along the line of weakness. A layer other than and preferably adjacent to the at least one layer can have the highest coefficient of absorption of the multiple layers of the laminate. When the at least one layer does not have the highest coefficient of absorption, it still can absorb more energy than the highest coefficient layer. Vaporization of either the at least one layer or the highest coefficient layer can form a line of weakness in itself and gases from the vaporization can aid in forming a line in weakness in one or more other layers and in the laminate. The laminate can have two substantially equally absorptive layers which selectively relatively absorb more energy than the other layers of the laminate. One or more lines of weakness can first be formed in the more readily degradable or the more oriented of the substantially equally absorptive layers. The lines can be formed adjacent a package seal to allow the lines to cooperate with the release of the seal such that the package can be opened along the seal.

DETAILED DESCRIPTION OF THE INVENTION

Figure 1:
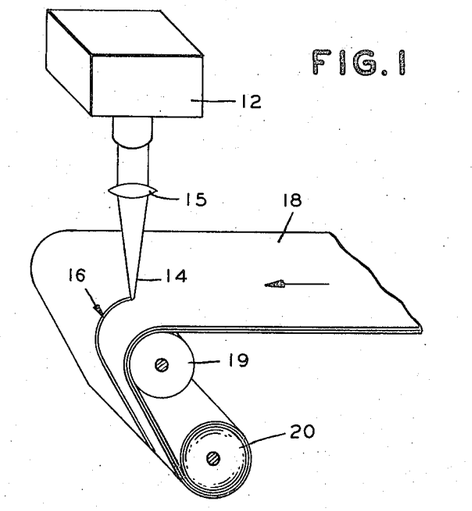
FIG. 1 shows a laser source emitting a beam which is forming a line of weakness in a multilayer thermoplastic laminate.

Shown in FIG. 1 is a laser source 12 emitting a beam of radiant energy 14 that is passing through a lens 15 and forming a line of weakness 16 in a multilayer laminate 18 being passed over a backing roll 19 and being fed into a wind up roll 20. The backing need not be a roll but can be any other suitable backing surface. FIG. 1 merely shows one way of implementing the method of this invention.

Although the source of radiant energy can be any source capable of providing radiant energy of sufficient intensity to form a line of weakness in a multilayer laminate according to the method of this invention, the preferred source is a laser. Although many lasers are capable of emitting a beam of radiant energy of such an intensity, it has been found that for commercially forming a preferential, easy opening tear line in multilayer laminate packaging materials, a laser whose beam is focusable to a small spot size or diameter is most suitable. A small spot size is desirable because energy therein contained is so concentrated that a small, precise volume of laminate material can be rapidly heated, vaporized or otherwise degraded in a manner that effects a clean cut or score line without affecting adjacent areas of the material.

The wavelength of the laser beam can be any wavelength whose relationship to the absorptive characteristics of the laminate materials is such that it will be selectively absorbed in at least one pre-selected layer in a manner that will effect a suitable line of weakness in that layer and in the composite laminate. The frequency of the radiation and other laser and beam characteristics such as the output power of the laser and mode structure and spot size of the beam, can be any combination which will provide a beam of radiant energy of the aforementioned sufficient intensity to effect the aforementioned line of weakness. For the purpose of this invention, a line of weakness is any alteration in the structure along a predetermined path in one or more layers of the laminate which allows the laminate to be preferentially folded, torn, separated, divided or otherwise manipulated along that path in a manner that was not possible without the line of weakness.

The output power of the laser can conceivably be of any wattage. High wattages are preferred for example when it is desired that the laser emit a plurality of beams. Thus, laser power can be in the range of up to about 500 watts in order to permit simultaneous use of say, five 100 watt beams or ten 50 watt beams. Multiple beams can be produced by any of the known means such as beam splitting by partial reflectors. Generally, the beam power used is varied depending on the thickness of the laminate being worked and the relative motion between the beam and the workpiece. For example, it has been found that for multilayer thermoplastic laminates of up to about 3.0 to 5.0 mils, it is advantageous to use beams of about two to 100 watts, preferably about two to 50 watts.

Either pulsed or continuous laser beams can be utilized according to the method of this invention. Pulsed beams can be employed for forming dashed or discontinuous lines of weakness, but continuous beams are preferred when lines of weakness such as continuous easy open tear lines are desired. Continuous beams are also preferred because they can subject laminates to a greater total amount of energy.

The mode structure of the laser beam can be single or multiple but single mode beams are preferred because their energy is more concentrated and because they are focusable to smaller spot diameters.

The laser beams preferably are focused but can be unfocused. The diameter of the spot to which a laser beam is focused to effect a satisfactory line of weakness according to the method of this invention can be of any suitable dimension, depending among other things on the thicknesses of the laminate layers and the type of degradation and the characteristics of the line of weakness desired. Although spots of beams of short wavelengths can be focused to sizes less than one micron in diameter, the minimum spot size for the carbon dioxide laser having a wavelength of 10.6 microns, can range from about 2.0 to 10.0 mils depending on beam mode structure and lens focal length. It has been found that for forming a preferential tear line in relatively thin multilayer laminates having a total thickness of up to about 3.0 to 5.0 mils, a minimum spot diameter is preferred. For the carbon dioxide laser, preferred spot sizes are from about 2.0 to 5.0 mils, but more preferred practical spot sizes are from about 2.0 to 3.0 mils. For purposes of this invention, a multilayer polymeric laminate is a laminate having at least one layer which is polymeric, and a multilayer thermoplastic laminate is one having at least one thermoplastic layer. Usually, at least one layer is polymeric.

Any suitable lens capable of focusing beams to the aforementioned small spot sizes can be utilized with the lasers of this invention. Lenses having short focal lengths are preferred because they provide the desired small spot sizes. A variety of materials known to the art are available for use as such lenses depending on the wavelength to be transmitted therethrough. For example, germanium, gallium arsenide or sodium chloride lenses can be used with the carbon dioxide laser.

An example of a suitable laser which possesses the aforementioned characteristics and which has been successfully utilized according to the method of this invention to form a preferential easy open tear line in multilayer thermoplastic laminates of a thickness of up to about 3.0 to 5.0 mils, is a carbon dioxide flowing gas laser having a power range of up to 25 watts and emitting a continuous single-mode beam having a wavelength of 10.6 microns focused to a spot diameter of about 2.0 mils by a one inch focal length germanium lens. The lens was fitted with a coaxial air nozzled to prevent debris from striking the lens and to clear out evolving gases in the vicinity of the line of weakness being formed. Another example of a suitable laser is the aforementioned neodymium-yttrium aluminum garnet laser which could have a wavelength as short as 1.06 microns.

The materials utilizable as layers in the multilayer laminate worked according to the method of this invention can be any of the materials utilized in the manufacture of flexible and non-flexible laminate packages. The materials usually and preferably are but need not be at least partially flexible and they can be absorptive or substantially non-absorptive of radiant energy. They can be polymeric, composite or non-polymeric. Utilizable polymeric materials include thermosets and thermoplastics. Although there is some controversy over the classification of certain materials as either thermosets or thermoplastics, e.g., cellulosics such as cellophane, materials usually considered thermosets and employable are phenolics, urethanes, epoxies, polyesters, caseins, aminos and silicones. Examples of materials usually considered thermoplastics and employable are acetals, acrylics, fluorocarbons, polyamides, polyolefins, styrenes and vinyls. Specific examples of thermoplastics are listed in Table II (shown later). An example of an employable composite material is paper and of an employable non-polymeric material is foil. Other materials which have been employed as intermediate layers or formed into flexible or semi-rigid or rigid multilayer laminate packages can also be utilized in the laminate of this invention. For purposes of this invention, adhesives are considered layers and can be used as any layer in the laminate.

The aforementioned polymeric, composite or non-polymeric materials can be utilized in any combination to comprise the laminate worked according to the method of this invention. For example, the laminate can be comprised of layers of materials of each class such as paper, thermoplastic an foil, or all of one class such as nylon, polyethylene and surlyn. The laminates generally include at least one layer that is polymeric. Commonly, it is thermoplastic.

The polymeric materials utilized are partly transparent to laser radiant energy. Otherwise stated, each material absorbs a certain amount of a laser beam of light of a given wavelength and intensity. The amount of light that is absorbed by a given material is indicated by its absorption coefficient or absorption constant. Table I, Column A, shows the absorption constants at 10.6 microns wavelength of typical thermoplastics used for manufacturing flexible multilayer thermoplastic laminates. Column B shows the percentage of carbon dioxide radiant energy of a wavelength of 10.6 microns that is absorbed by each thermoplastic having a thickness of 1.0 mil. A high absorption coefficient indicates that a relatively great amount of energy per unit thickness is absorbed by the material.

ner in which it is absorbed by a material is important because, when a beam of light is absorbed, the energy carried by its light waves is transformed largely into heat. It is this heat that acts on, degrades or alters the structure of the material and thereby forms a line of weakness in it. Since the amount of energy absorbed by a material, and consequently the heat acting thereupon, is determined by the absorption coefficient of the material, and since the distribution of energy is determined by the aforementioned exponential absorption law, the Graph of FIG. 2 can also be said to show the amount of heat generated by the beam that acts upon a material at various points along and throughout its thickness. Two factors which are pertinent here are the thermal conductivity and thermal diffusivity of the material. Thermal conductivity is a measure of how much heat a material will allow to pass through a given thickness per unit area under a unit temperature gradient. Thermal diffusivity is a measure of how fast the temperature gradient will be established in the material. The thermal conductivity and diffusivity of plastics are both low when compared to metals. Low thermal diffusivity and conductivity are desired when it is preferred that heat input and resulting degradation or vaporization be localized.

TABLE I.—ABSORPTION OF RADIANT ENERGY AND THERMAL PROPERTIES OF COMMON POLYMERS

| Material | A<br>Absorption percent constant at 10.6 μ<br>$\alpha$ (CM$^{-1}$) | B<br>Absorbed in 1 mil. thick samples | C<br>Melting point (°C) | D<br>Degradation activation temp. (°C) |
|---|---|---|---|---|
| Polycaproamide (Nylon 6) | 140 | 30.0 | 220 | 310–380 |
| Polyethylene, medium density | 18 | 4.5 | 115–137 | 374–436 |
| Polypropylene | 32 | 7.8 | 176 | 336–366 |
| Polyethyleneterephthalate | 155 | 33.0 | 267 | 336–356 |
| Surlyn (A8071) | 95 | 12.0 | | |
| Polystyrene (Isotactic) | 86 | 20.0 | 240 | 299–343 |
| Saran (commercial wrap) | 226 | 44.0 | | |
| Polyvinyl Chloride | 300 | 53.0 | 212 | 150–190 |
| Polyvinyl Alcohol | 400 | 64.0 | Soften (200) | 250 |

The radiant energy absorbed by a material is not uniform through its thickness. Since energy is absorbed as the beam passes into a material, the intensity of the beam, or the remaining energy carried by the light waves decreases as the beam passes more deeply into the thickness of the material. How much the intensity of the beam decreases as the beam passes through a given material is determined by the exponential absorption law:

$$I = I_o e^{-\alpha d}$$

where I is the beam intensity at a particular distance "d" from the surface of the material receiving the incident energy $I_o$ and having an absorption coefficient $\alpha$.

Figure 2:
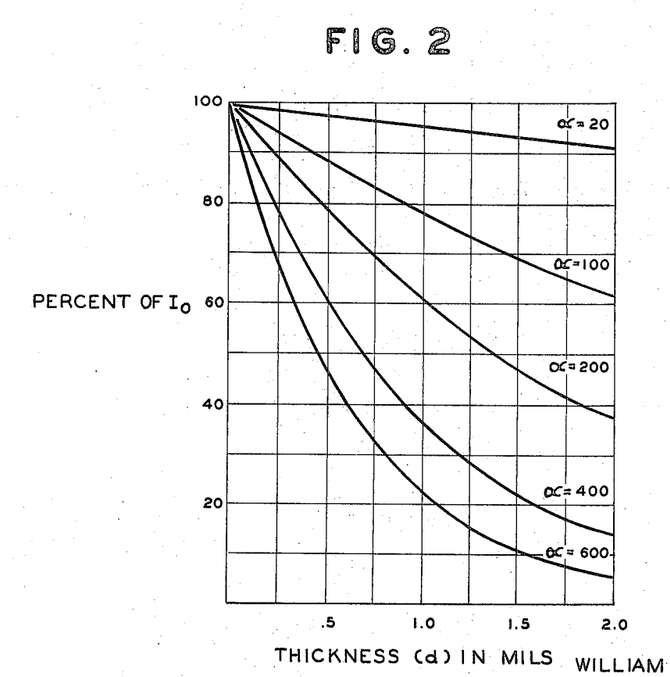
FIG. 2 is a Graph showing the intensity distribution of radiant energy as it passes through 2 mil thick sheets of thermoplastic materials.

The Graph of FIG. 2 shows the intensity distribution or how much of the incident beam of radiant energy is absorbed as the beam passes through various points of different 2.0 mil thick sheets of thermoplastic materials. More particularly, the Graph shows that the energy absorbed at 10.6 microns is fairly uniform for a highly transparent, relatively non-absorptive, i.e., low $\alpha$ material such as polyethylene, but is quite non-uniform for a relatively non-transparent and highly absorptive, i.e., high $\alpha$ material such as polyvinyl alcohol.

The amount of radiant energy absorbed and the man-

The effect heat has upon a thermoplastic is well known. A thermoplastic melts when its temperature is increased to its melting point. Melting points of thermoplastics listed in Table I are given in Column C. At temperatures of from about 50° to 100° C or more above the melting point of each material, there is a range of temperatures (Column D) within which there is sufficient heat to further degrade or decompose the material as by vaporization. Generally speaking, vaporization occurs when the heat so excites electrons in atoms that bonds in and between the thermoplastic molecules are broken and the existing atomic order of the material is thereby altered to the disorder of a gas.

Vaporization is commonly believed to be the manner in which a laser beam effects a score line in a layer of material. When there is relative movement along a predetermined path between a laser beam of a particular wavelength and a layer of a material partly transparent to that wavelength, energy the width of the diameter of the beam and more concentrated at its center, is absorbed into the material. In thermoplastics for example, as the energy is absorbed it is transformed into heat which softens and melts the material along the beam path. Toward the center of the beam path where the intensity is greatest, some of the thermosplastic molecules are vaporized and the resulting expanding gases form the score line in the material. If the molecules that are vaporized are at the surface of the material, their gases leave cavities as they rise directly into the atmosphere. If the vaporized molecules are not on the surface, their gases form bubbles which rise through, blow out, or even, if the energy density is great enough, explode through surrounding and/or overlying melted material. As the expanding bubbles form and rise, they mechanically move molten material out of the way. Under proper conditions, e.g., when a beam of sufficient intensity is subjected to a material for a sufficient time, enough molecules are vaporized along a line such that resulting bubbles merge, coalesce, or otherwise cooperate to form a score line or groove. The material moved by the bubbles forms a slightly protruding bead along the surface of each of the groove's upper longitudinal edges. Although most of the bubbles which form the score line result from vaporization of thermoplastic material, some bubble sites apparently result from hot spots causes by highly absorbent impurities such as dirt or metals and from entrapped moisture or gases normally present for example in molecular lattice structures and grain boundaries of the thermoplastic. The size and distribution of bubbles occurring in a material depend on several factors including the intensity of the beam, the time it impinges an area of the material and the characteristics of the material itself.

Where vaporization of molecules occurs in a material, i.e., at its surface or within its thickness, depends on the coefficient of absorption as applied in the exponential absorption law and on the thermal diffusivity and conductivity of the material. Vaporization will first occur mostly at or near the incident surface and will proceed downward increment by increment into materials having high coefficient, whereas it will occur fairly uniformly through the thickness of those having a low coefficient of absorption. It has been found difficult to groove and leave sufficient residual material in thin layers of low $\alpha$ material because their fairly uniform manner of vaporization requires highly critical control of processing conditions such as material beam exposure time.

Figure 7:
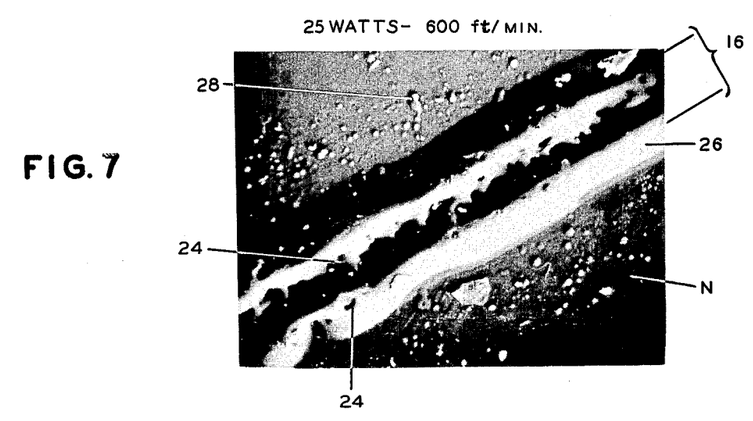
FIG. 7 is an enlarged perspective view of a line of weakness formed in a two layered thermoplastic laminate by a laser beam of 25 watts at 600 ft/min.
Figure 8:
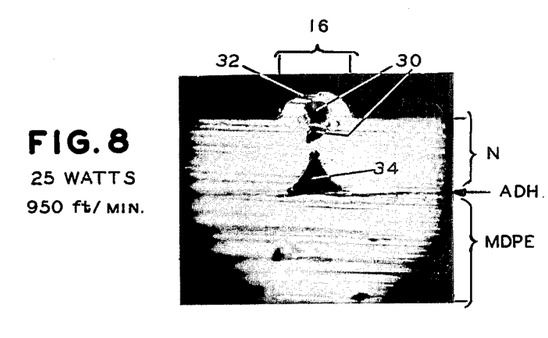
FIG. 8 is an enlarged cross section of a line of weakness formed in a two layered laminate like that of FIG. 7, this time at 25 watts at 950 ft/min.

As for relative positioning of the layers selected to comprise the multilayer laminate of this invention, the more absorbent or absorptive layer, i.e., the one having the highest coefficient of absorption, can be at any level in the laminate but preferably it is not least proximate to the source. When the laminate includes a more absorbent, i.e., absorptive, layer proximate to the source and a less absorbent underlying layer, a score, cut or other line of weakness can be safely effected by vaporization of the proximate layer without substantial danger of affecting or cutting completely through the underlying layer of the laminate. This is because any excess energy due to, for example, excess exposure time will substantially pass through the underlying less absorbent layer. As examples of such combinations of layers, the overlying layer or layers can be paper, which essentially is totally absorbent, polyvinyl alcohol, polyethyleneterephthalate or nylon, and the underlying layer can be polypropylene or polyethylene, or even foil. FIGS. 7 and 8 show laminates of nylon on polyethylene.

Figure 9:
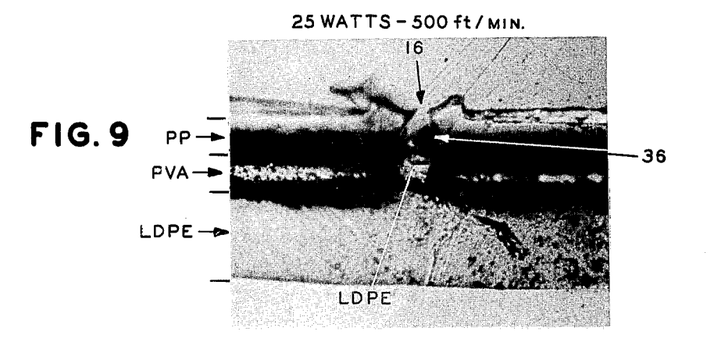
FIG. 9 is an enlarged cross section of another type of line of weakness which can be formed in a three layer thermoplastic laminate by a laser beam of 25 watts at 500 ft/min.
Figure 10:
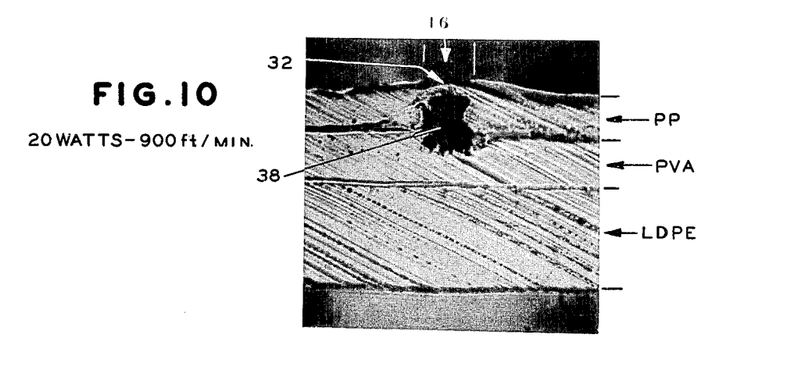
FIG. 10 is an enlarged cross section of a line of weakness formed in a laminate like that of FIG. 9 by a beam of 20 watts at 900 ft/min.
Figure 11:
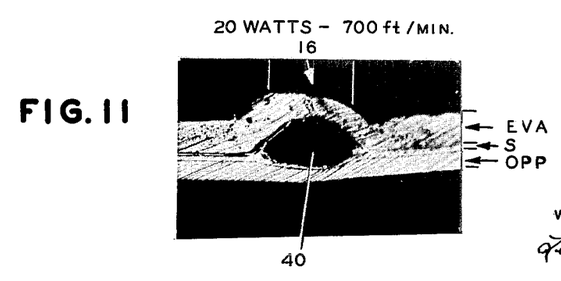
FIG. 11 is an enlarged cross section of a line of weakness formed in a multilayer thermosplastic laminate by a laser beam of 20 watts at 700 ft/min.

When the relatively more absorbent layer is in an interior position and is covered by one or more, less absorbent polymeric or composite materials and backed by a least absorbent layer, a line of weakness can be formed in the laminate by vaporization solely of the more absorbent inner layer or of it and other layers. The laser beam penetrates the overlying layers perhaps somewhat affecting them and vaporizes the inner layer without materially affecting the backing layer. Bubbles forming therein could for example be entrapped between the outer layers to form a cavitous line of weakness, or could flow out through the path of least resistance, usually upward through the softened molten or partially vaporized upper layer or layers. Examples of such combinations of layers are shown in FIGS. 9, 10 and 11.

When the more absorbent layer is least proximate to the source and overlying layers are less absorbent, a line of weakness can be formed by a beam which penetrates and loses some energy to but may not substantially affect at least one of the overlying layers but which has sufficient energy left to vaporize the least proximate, absorbent layer. With this combination of layers, vaporized gases could escape for example through the undermost surface of the least proximate layer or through overlying layers. The escape of such gases can be used to cooperate with one or more lines of weakness to form easy opening tearing means such as tear strips and pull tabs. For example, the escape can aid in the delamination of layers or the overcoming of a seal along a certain path between layers and can thereby cooperate with one or more adjacent or parallel lines of weakness to provide the easy opening feature. Of course, the lines of weakness can, without the use of escaping gases, cooperate with a package seal to aid in the releasing of one or more sealed layers from one or more adjacent layers in an easy opening manner.

In the aforementioned case in which a less absorbent layer overlies a more absorbent layer, there may be laminates in which the less absorbent layer absorbs more energy than the highest coefficient layer. For example, in a laminate, a less absorbent material such as polyethylene may be sufficiently thick to absorb a greater amount of energy than a more absorbent underlying layer of polyvinyl alcohol. In such a laminate, vaporization of the polyvinyl alcohol forms one or more lines of weakness in itself, and, gases from such vaporization aid in forming one or more lines of weakness in the less absorptive polyethylene layer and in the laminate.

In the laminates which can be worked according to the method of this invention, the at least one layer usually is but need not be the most absorptive or absorbent layer, i.e. the one having the highest coefficient of absorption. The laminates can include a layer or layers that have a higher coefficient of absorption than the at least one layer. Regardless of whether the at least one layer has the highest coefficient of absorption, it selectively relatively absorbs a sufficient amount of energy to alter its structure in a manner that forms a line of weakness in the laminate. It absorbs sufficient energy to vaporize some of its own material and thereby form a line of weakness in itself, and, gases from the vaporization aid in forming a line of weakness in one or more but not all the layers of the laminate. When, for example, another layer has a coefficient of absorption higher than what has been called the at least one layer, that other layer can, like the at least one layer, absorb sufficient energy to vaporize some of its own material and thereby at least partly from a line of weakness in itself. Gases resulting from vaporization of its material can aid in the forming of the line of weakness in the at least one layer and in the laminate.

Although what has herein been called the at least one layer usually plays a major role in effecting a line of weakness in most laminates, the aforementioned example shows that in some laminates, there can be other layers that absorb sufficient energy to share in the role or to conjoin in effecting a line of weakness in a laminate. Preferably, layers sharing the role are adjacent to each other.

Laminates which can be worked according to the method of this invention can include two substantially equally absorptive layers which selectively relatively absorb more energy than the rest of the layers of the laminate. One of these two layers can be more readily degradable, e.g., vaporizable, due to the nature or characteristics of the material, or more oriented than the other, and, in such case, of the layers of the laminate, the line of weakness can be first formed in the more readily degradable or more oriented layer.

The composite materials employable in the multilayer laminate which can be worked according to the method of this invention can be positioned at any level in the laminate. When it is highly absorbent material such as paper it preferably is the proximate layer. When a non-polymeric material such as foil or some other highly reflective material is utilized as a layer, it least preferably is the proximate layer and preferably is, or is adjacent, the least proximate layer. A reflective layer such as foil can be advantageously utilized to speed up the vaporization of one or more overlying absorptive layers. Since it is reflective and is not usually greatly affected by the laser beam, the foil remains intact and provides desirable strength and barrier properties to the laminate. It has been found advantageous to use foil as an underlying layer for overlying thermoplastic and/or paper layers. Many other possible non-polymeric materials such as reinforcing agents used as intermediate laminate layers can be utilized advantageously, the manner in which they are used being dependent upon their absorption coefficients and how they are selectively utilized according to the method of this invention. For example, vaporization of a highly absorbent adhesive such as "Adcote" (503-A) (defined later), can, as shown in FIG. 8, be effectively used to aid in forming a line of weakness in the nylon layer of a nylon polyethylene laminate or any other multilayer laminate having a sufficiently absorptive and melting overlying layer.

Figure 3:
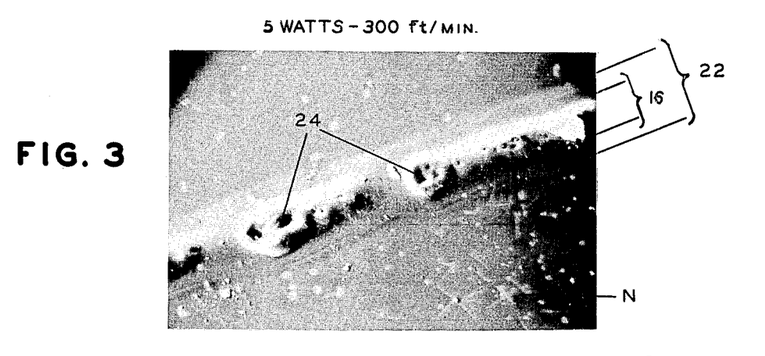
FIG. 3 is an enlarged perspective view showing the effect of subjecting a multilayer thermoplastic laminate to a laser beam of five watts power at a rate of 300 ft/min.
Figure 4:
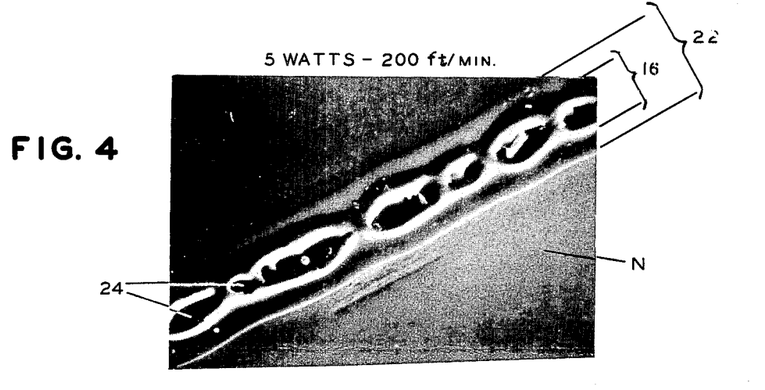
FIG. 4 is an enlarged perspective view showing the effect of subjecting a different area of the multilayer laminate of FIG. 3 to the same laser beam at a rate of 200 ft/min.
Figure 5:
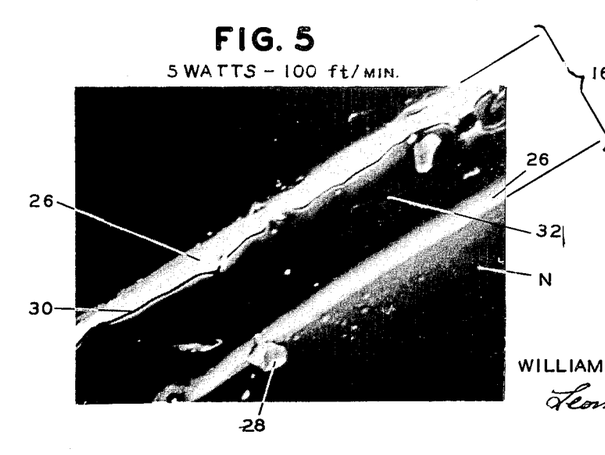
FIG. 5 is an enlarged perspective view of a line of weakness formed in still another area of the multilayer laminate of FIGS. 3 and 4 by the same laser beam at a rate of 100 ft/min.

FIGS. 3 through 5 show the effect of impinging a laser beam of radiant energy on a multilayered thermoplastic laminate and show the sequence and manner in which a line of weakness is formed in thermoplastic laminates moved through a carbon dioxide laser beam of five watts having a wavelength of 10.6 microns focaused to a spot diameter of 2.5 mils, by a 1 inch germanium lens. In each figure, the rate of movement of the laminate is decreased to increase exposure time and to increase the total amount of energy instantaneously subjected to the laminates. The Figures are enlargements taken with a Scanning Electron Microscpe. Magnification nu;bers are approximations. Demarcations of lines of weakness are somewhat arbitrary and are morelike boundaries of weakened areas, since, in examining greatly enlarged photographs, it is difficult to point out precisely where within the weakened area the line of weakness will be. For purposes of this invention, the line of weakness is, or is within, the weakened area.

FIG. 3 is an enlarged (300X) top perspective view of the top layer of a three layer thermoplastic laminate irradiated by the five watt beam at 300 ft/min. and comprised of 0.75 mil. polycaproamide (Nylon 6)N, 0.5 mil. Surlyn AD8071 (not shown) and a 1.5 mil. blend of 50 percent Surlyn AD8071 and 50 percent high density polyethylene (not shown). Surlyn is a trademark owned by E. I. DuPont de Nemours and Company. Surlyn AD8071 is a zinc ionized copolymer of ethylene and a dicarboxylic acid. The top layer of Nylon 6, N, is proximate to the laser source and first receives the incident beam of radiant energy. As shown in Table I, of the three layers, Nylon 6 has the highest absorption constant (140) of the respective layers. It therefore is the layer that absorbs relatively more of and is most affected by the energy of the beam. The nylon material is heated and is softened and swollen along a path 22 approximately the diameter of the beam, the effects being greater along the center of the beam diameter than towards its outer edges. Along the center, small bubbles intermittently coalesced to form large bubbles, which rose through the softened molten material and blew out into the atmosphere leaving hardened intermittent craters 24 forming a line of weakness 16 in the laminate.

FIG. 4 is an enlarged (300X) top perspective view of another portion of the laminate of FIG. 3 irradiated at the same wattage but at a slower speed, 200 ft/min. The slower speed allowed the laminate to be exposed to more energy. This resulted in the formation of more bubbles and a line of weakness 16 which is more continuous. As in FIG. 3, the intensity or energy is greatest along the center of the diameter of beam path and diminishes toward its edges.

FIG. 5 is an enlarged (460X) top perspective view of still another portion of the laminate of FIGS. 3 and 4 irradiated at the same wattage but this time at the still slower speed of 100 ft/min. The figure shows that five watts at 100 ft/min. provides enough energy to substantially completely remove the Nylon material in a manner that forms a continuous, rather uniform, essentially flat bottomed line of weakness 16, score or groove in the laminate. The material is removed from the center of the path by heat which relieves material stresses and by mechanical action of the coalescing, expanding, and rapidly and sometimes explosively rising bubbles. Although most of the material is moved by bubbles to form raised edges or beads 26 along edges of the line of weakness, some of the material 28 is explosively thrown from the path and some is vaporized into gaseous products. Line of demarcation 30 marks the interface between the Nylon and Surlyn SUR materials. Crack 32 is a crack in the surface of the Surlyn material.

Figure 6:
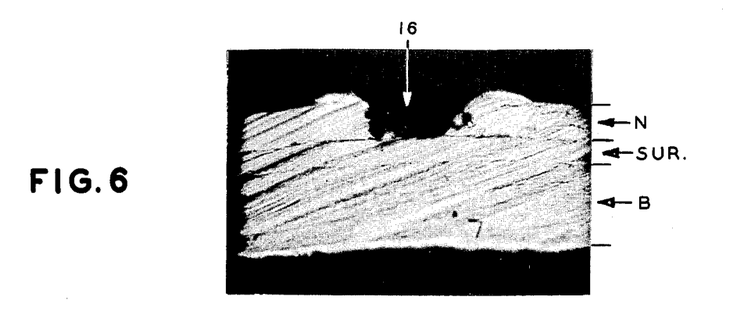
FIG. 6 is an enlarged cross section of a line of weakness formed in the multilayer thermoplastic laminate of FIG. 5.

FIG. 6 is an enlarged (460X) cross section through line of weakness 16 of FIG. 5. The Figure shows that all of the more absorptive nylon upper layer N has been removed by the laser beam leaving line of weakness 16, while the underlying, less absorptive Surlyn SUR and blend B layers remain intact and substantially unaffected.

FIG. 7 is an enlarged (300X) top perspective view of a line of weakness 16 formed by the previous laser beam operated at 25 watts at 600 ft/min. in a two layered laminate comprised of a source-proximate, more absorptive upper layer of 1.5 mil. Nylon 6, N, and a much less absorptive underlying layer of 3.0 mil. medium density polyethylene MDPE (not shown). This figure shows a line of weakness 16 having blow holes or craters 24 on and within its line of weakness and its bead 26. The Figure also shows that not all lines of weakness or score lines have a relatively flat bottom surface like that of FIG. 5, but can as well have irregular, punctured profiles and configurations. At least some of the material 28 lying on the laminate surface to the side of the groove was thrown from the groove by explosively expanding gas bubbles.

FIG. 8 is an enlarged cross section (460X) taken of a laminate of the same materials and thicknesses as FIG. 7, line of weakness 16 this time being formed at 25 watts at 950 ft/min. The adhesive Adh. used in this laminate is a two component urethane based system sold under the trademark "Adcote" (503–A) which is owned by Morton Chemical Company. The figure shows that the source proximate regions of Nylon layer N were vaporized. Bubbles of gases rose to the atmosphere through overlying and surrounding molten Nylon, leaving cavities 30. The gases rose through craters not apparent in the Figure because the cross section was taken through a selected, unbroken bridge portion 32 of the groove. Also shown is triangular cavity 34 in the bottom half of the Nylon layer. The laser beam acted locally on the proximate region of the absorbent Nylon layer, and, as the beam penetrated deeper into the laminate, some of the radiant energy not absorbed by the Nylon was absorbed by and was sufficient to nearly simultaneously vaporize the thin layer of highly absorbent and highly gas producing adhesive Adh. Gases rising from the vaporized adhesive triangularly peaked into the overlying softened Nylon layer. Under suitable processing conditions, adhesive-formed cavities can extend into the upper Nylon avities to form a continuous cut through the Nylon layer. Again, the underlying, relatively non-absorbent polyethylene layer MDPE was essentially unaffected and remained intact. This figure demonstrates that adhesives, especially high absorbent ones, can be selectively altered and their gases can be used either to speed up scoring or cutting or to form a tunneled, cavitous line of weakness in a multilayered laminate. The Figure also shows that top perspective views do not necessarily show the effect a laser beam has on the interior regions of a multilayer laminate.

FIG. 9 is an enlarged (460X) cross section of a line of weakness 16 affected in a three layer thermoplastic laminate by a laser beam of 25 watts at 500 ft/min. The laminate is comprised of a proximate upper layer of relatively non-absorptive 0.75 mil. polypropylene PP, an inner, highly absorptive layer of 0.8 mil. polyvinyl alcohol PVA and an underlying, least-absorptive layer of 2.0 mil. low density polyethylene LDPE. By "proximate", applicant means the layer of the laminate which is most proximate to the source of radiant energy. By "non-proximate", applicant means a layer which is not the most proximate layer in relation to the source. The Figure shows that while a little of the radiant energy from the laser beam was absorbed by and therefore heated and softened the relatively non-absorbent polypropylene, most of the energy penetrated or passed through and was selectively absorbed by the more highly absorptive and highly degrading polyvinyl alcohol layer. Bubbles formed there and blew out through the overlying softened polypropylene thereby forming line of weakness 16. Enough of the incident energy passed through the polyvinyl alcohol to cause the underlying relatively non-absorptive polyethylene to heat, soften and swell up into gap 36 formed by the blown out polyvinyl alcohol.

FIG. 10 is an enlarged (360X) cross section of the same material and thicknesses shown in FIG. 9, the line of weakness this time being formed at 20 watts and 900 ft/min. This Figure shows that whereas the slower speed and higher wattage of FIG. 9 allowed energy to affect the underlying polyethylene layer PE, the faster speed and lower wattage of this Figure only vaporized the upper portions of the polyvinyl alcohol PVA. The underlying polyethylene was left unaffected. Vaporization formed line of weakness 16 which appears as cavity 38 in and between the polypropylene PP and polyvinyl alcohol layers. Actually, gases escaped through craters (not shown). Again, the cross section was taken through a bridge area 32.

FIG. 11 is an enlarged (460X) cross section of a line of weakness 16 formed by a laser beam of 20 watts at 700 ft/min. in a three layer thermoplastic laminate comprising a moderately absorptive proximate upper layer of 1.3 mil. ethylvinyl acetate EVA, a highly absorptive inner layer of 0.2 mil. Saran S and a relatively non-absorptive underlying layer of 1.1 mil. oriented polypropylene Opp. FIG. 10 illustrates the theory that while some of the radiant energy from the laser was absorbed by and heated and softened the overlying ethylvinyl acetate, most of the energy passed through it and was selectively absorbed by the inner Saran. The upper portion of the Saran was vaporized into gas which formed cavity 40 between the molten flexible ethylvinyl acetate and the relatively unaffected layer of oriented polypropylene. The ethylvinyl acetate was not heated enough to be vaporized and was not sufficiently weakened to allow the Saran vapor to escape therethrough. The phenomena of cavity formation is not solely characteristic of the particular laminate of this and previous figures, but, given suitable operating conditions and characteristics and thicknesses of materials, i.e., an absorptive inner layer and a less absorptive outer layer, a cavity may form and become a line of weakness in most any multilayer laminate.

The operating conditions and parameters for employing the method of this invention can vary widely generally depending on such aforementioned factors as the type of laser used, the wavelength, frequency, power, continuity, mode structure and focusability of the beam, and the characteristics of the line of weakness desired and the characteristics and intended uses of the laminate. When the above factors have been considered and the required line of weakness specified for the given laminate, the processing parameters can then be defined in terms of beam intensity in watts/in.$^2$ and exposure time in ft/min.

Beam intensity is determined by beam power and spot diameter. For example, a carbon dioxide laser beam of 25 watts power can have a beam intensity of about 3.5 megawatts/in.$^2$ when focused to a spot diameter of about 3.0 mils. If spot diameter is held constant, intensity is directly determined by power. If, as usually is the situation, the intensity, i.e., both spot diameter and power, is held constant, exposure time determines the total amount of energy delivered to a given amount of material. Exposure time is determined by rate of relative movement between the laser beam and the laminate.

Relative movement assures that exposure time is not excessive, i.e., that the laser beam does not linger on and cut completely through the laminate being worked. It also allows a line of weakness to be formed along any predetermined path of any directioon or configuration. Either the laser beam or the laminate or both can be moved in relation to each other along the path. Preferably, the laminate is passed under a stationary beam. For forming lines of weakness in continuous lengths of flexible multilayer thermoplastic laminates, it has been found convenient to place one or more stationary lasers at the end of a laminating line so that its beams produce desired lines along the length of the laminate sheet as it is being wound onto a wind up roll. The motion can be at any suitable rate for a particular selected combination of the aforementioned factors. More particularly, the rate of speed is controlled and is correlated with beam intensity, with coefficients of absorption of the laminate layers especially the most absorptive thereof, and with the type and depth of line of weakness desired. For example, as shown in FIGS. 3 through 6, at 5 watts power for the particular laminate worked, speed or exposure time had to be reduced from 300 to 100 ft/min. to produce a continuous groove.

Examples of ranges of processing speeds which can be utilized for effecting satisfactory tear lines in various multilayer thermoplastic laminates are shown in Table II below. The tear lines were obtained by moving the laminates under a carbon dioxide gas laser emitting a continuous single mode beam of 25 watts focused to an approximate spot diameter of 2.5 mils. The first material listed for each laminate is most proximate to the laser. Thicknesses of the materials are in thousandths of an inch. For the aforementioned laser and beam conditions, ranges of processing speeds for the various laminates can be speeds arbitrarily selected as low, below about 500 ft/min., medium, from about 501 to about 1000 ft/min., high, from about 1001 to 2000 ft/min. and very high, from above about 2001 ft/min.

TABLE II

Processing Speeds for Typical Packaging Materials

| Material | Thickness (mils) | Ranges of Processing Speeds |
|---|---|---|
| Nylon | 1.00 | LOW |
| Surlyn | 1.00 | |
| Low Density Polyethylene | 1.50 | |
| Nylon | 0.75 | LOW |
| Surlyn | 0.50 | |
| Blend (50% Surlyn and 50% High Density Polyethylene) | 1.50 | |
| Paper | 2.00 | LOW |
| Polyethylene | 1.00 | |
| Foil | 0.30 | |
| Polyethylene | 1.50 | |
| Ethylvinyl Acetate | 1.30 | MEDIUM |
| Saran | 0.20 | |
| Oriented Polypropylene | 1.10 | |
| Nylon | 1.50 | MEDIUM |
| Medium Density Polyethylene | 3.00 | |
| Polypropylene | 0.75 | MEDIUM |
| Polyvinylidene Chloride | 0.15 | |
| Low Density Polyethylene | 1.80 | |
| Polypropylene | 0.75 | MEDIUM |
| Low Density Polyethylene | 0.50 | |
| Foil | 0.35 | |
| Low Density Polyethylene | 1.00 | |
| Polypropylene | 0.75 | MEDIUM |
| Polyvinyl Alcohol | 0.80 | |
| Polyethylene | 2.00 | |
| Ethylvinyl Acetate | 2.30 | HIGH |
| Kcello (Saran coated cellophane) | 0.75 | |
| Polypropylene | 0.50 | |
| Polyethyleneterephthalate | 0.75 | HIGH |
| Polyethylene | 3.00 | |
| Polyethyleneterephthalate | 0.50 | VERY HIGH |
| Medium Density Polyethylene | 2.00 | |

Processing speeds can be altered by treating or preaffecting the materials comprising the layers of the multilayer laminate. For example, when certain lasers are used, speeds can be increased by orienting one or more of the thermoplastic layers and using polarizing optics to plane polarize a beam impinged along or preferably perpendicular to the direction of orientation.

Another method of increasing speeds is the known method of selectively treating one or more of the materials and/or one or more of the surfaces in a manner that will make them more absorptive to laser radiant energy of certain wavelengths. For example, it is known that materials can include or be coated with polar compounds such as acids, and their surfaces can be exposed to vapors of polarized compounds such as ammonia gas to make them more absorptive. Also, highly absorptive, gas generating materials can be included as an ingredient in one or more of the particular laminate layers or they can be used to treat the one or more surfaces of the layers to increase absorption and vaporization and, therefore, to increase the speed at which a line of weakness can be formed in the laminate. For example, a thermoplastic laminate can include a selected layer of an absorptive, gas generating adhesive such as the aforementioned "Adcote" (503-A) between and bonding layers of nylon and polyethylene.

Still another method increasing processing speed is to include in the laminate a reflective layer such as foil. Laser light waves are reflected off the foil back into the material through which the waves entered so that the material absorbs more energy than if it were impinged by a beam passing through it in only the original direction. For example, polypropylene can be vaporized more quickly when backed by an underlying reflective layer of foil than when it is not backed by the foil. This is so even though the polypropylene can be nonproximate to the source or even proximate to the source with a relatively non-absorbent layer of say polyethylene between it and the foil.

With power ranges tested, it has been found that at least for certain materials, the relationship between energy density and rate of movement is generally linear. For example, for a laminate comprised of layers of given thicknesses of Nylon 6(proximate), Surlyn AD8071 and a 50 – 50 percent blend of Surlyn AD8071 and high density polyethylene, lines of weakness appear similar and tear lines satisfactory when spot size was held constant and power and speed were varied by the same factor, i.e., five watts at 100 ft/min., 10 watts at 200 ft/min., etc. The range of power tested was from about five to 25 watts. In terms of efficiency, at low intensities, heat transfer capabilities of the material may become a factor, and, at high intensities dynamics of vaporization may alter efficiency, e.g., the material may be explosively removed from the impinged area rather than merely being moved aside by gradual relaxation of stresses and bubble movement.

When the method of this invention is utilized to form a line of weakness in a multilayer laminate, product-environment exchange-barrier properties of the laminate remain essentially the same. Several of the multilayer laminates listed in Table II were made into pouches and scored according to the method of this invention and tested to determine and compare oxygen permeability of scored versus unscored laminates. Test results indicated that suitable score or tear lines in the laminated pouches did not appear to affect their barrier properties. Additional tests showed that the tear lines also did not appear to affect the physical strength of the pouches. Air was pumped into them to determine maximum pressure required to rupture tear lines. Heat seals at the edges of the pouches failed while material adjacent the tear lines remained intact. Two reasons why barrier and strength properties appear unaffected are that the lines of weakness formed are very narrow, i.e., up to aout 2 to 3 mils., and at least one layer of the laminate remains intact.

In order to facilitate manipulation, e.g. tearing, of a multilayer laminate along a line of weakness, one or more of the multiple layers can be oriented in a predetermined direction, preferably along the line of weakness to impart a preferential weakness in the laminate that cooperates with the formed line of weakness.

I claim:

1. A method of forming at least one line of weakness in a laminate having multiple layers, said line of weakness being formed in at least one but not all of said layers, which comprises, effecting at a certain rate of speed along a predetermined path, relative movement between said laminate and at least one theretoward source-directed beam of radiant energy, said beam being directed to pass through a layer proximate to the source without vaporizing said proximate layer, said energy having a particular predetermined wavelength and intensity such that said energy is selectively relatively absorbed by said at least one layer in an amount sufficient to directly preferentially vaporize said at least one layer and gases formed by said vaporization form said line of weakness in said at least one layer and in said laminate, said at least one layer being a layer which is not the most proximate layer in relation to said source.

2. The method of claim 1 wherein said laminate is at least partly flexible.

3. The method of claim 1 wherein said at least one layer is polymeric.

4. The method of claim 3 wherein one or more of the non-proximate layers other than said at least one layer is foil and reflects an amount of said energy sufficient to aid in the forming of said line of weakness in said at least one layer.

5. The method of claim 1 wherein said at least one layer is a thermoset.

6. The method of claim 5 wherein one or more of the non-proximate layers other than said at least one layer is foil and reflects an amount of said energy sufficient to aid in the forming of said line of weakness in said at least one layer.

7. The method of claim 1 wherein said at least one layer is paper.

8. The method of claim 7 wherein one or more of the non-proximate layers other than said at least one layer is foil and reflects an amount of said energy sufficient to aid in the forming of said line of weakness in said at least one layer.

9. The method of claim 1 wherein said at least one layer is thermoplastic.

10. The method of claim 9 wherein one or more of the non-proximate layers other than said at least one layer is foil and reflects an amount of said energy sufficient to aid in the forming of said line of weakness in said at least one layer.

11. The method of claim 1 wherein each of said layers of said laminate is polymeric.

12. The method of claim 1 wherein each of said layers of said laminate is thermoplastic.

13. The method of claim 1 wherein one or more of the non-proximate layers other than said at least one layer reflects an amount of said energy sufficient to aid in the forming of said line of weakness in said at least one non-proximate layer.

14. The methd of claim 13 wherein said one or more non-proximate reflecting layers is foil.

15. The method of claim 1 wherein one or more of said multiple layers is oriented in a predetermined direction, and said orientation aids in the forming of said line of weakness such that greater processing speed is achieved than if said one or more layers was not oriented.

16. The method of claim 1 wherein said at least one layer is treated in a manner that makes it more absorptive of said energy than the rest of said layers.

17. The method of claim 1 wherein said at least one layer is an adhesive.

18. The method of claim 1 wherein said at least one layer has the highest coefficient of absorption of said multiple layers of said laminate.

19. The method of claim 1 wherein a layer other than said at least one layer has the highest coefficient of absorption of said multiple layers of said laminate.

20. The method of claim 19 wherein said other layer absorbs sufficient energy to vaporize some of its own material and thereby at least partly form said line of weakness in itself, and, gases resulting from said vaporization aid in the forming of said line of weakness in said at least one layer and in said laminate.

21. The method of claim 20 wherein said highest coefficient layer is adjacent said at least one layer.

22. The method of claim 21 wherein said highest coefficient layer is an adhesive.

23. The method of claim 1 wherein said at least one layer is formed of two substantially equally absorptive layers which selectively relatively absorb more of said energy than other layers of said laminate.

24. The method of claim 23 wherein one of said substantially equally absorptive layers degrades more readily than the other and said line of weakness is first formed in said more readily degradable layer.

25. The method of claim 23 one of said substantially equally absorptive layers is more oriented than the other, and a line of weakness is first formed in it rather than in the other of said substantially equally absorptive layers.

26. The method of claim 25 wherein said direction of orientation is substantially at right angles to said line of weakness.

27. The method of claim 1 wherein the laminate is in the form of a package having a seal, and said one or more lines of weakness are formed adjacent said seal so that said one or more lines of weakness cooperate with said seal such that one or more sealed layers of said package can be released from adjacent layers of said package in a manner that said package is opened along said seal.

28. The method of claim 1 wherein one or more of said multiple layers is oriented in a predetermined direction thereby imparting a partial preferential weakness in said laminate that cooperates with said formed line of weakness to achieve easier manipulation of said laminate along said line of weakness than if said one or more multiple layers was not so oriented.

29. The method of claim 28 wherein said direction of orientation is substantially in the same direction as said line of weakness.

30. The method of claim 1 wherein said source-directed beam is interrupted so that said line of weakness is not continuous.

* * * * *